(12) United States Patent
Vijendra et al.

(10) Patent No.: US 7,860,016 B1
(45) Date of Patent: Dec. 28, 2010

(54) METHOD AND APPARATUS FOR CONFIGURATION AND ANALYSIS OF NETWORK ROUTING PROTOCOLS

(75) Inventors: Sudhir Vijendra, White Plains, NY (US); David Ohsie, Baltimore, MD (US)

(73) Assignee: EMC Corporation, Hopkinton, MA (US)

( * ) Notice: Subject to any disclaimer, the term of this patent is extended or adjusted under 35 U.S.C. 154(b) by 1425 days.

(21) Appl. No.: 11/211,234

(22) Filed: Aug. 25, 2005

Related U.S. Application Data

(60) Provisional application No. 60/604,325, filed on Aug. 25, 2004.

(51) Int. Cl.
*H04J 1/16* (2006.01)
(52) U.S. Cl. .................. 370/242; 370/230; 370/252
(58) Field of Classification Search .......... 370/465, 370/473, 363, 252, 230, 254
See application file for complete search history.

(56) References Cited

U.S. PATENT DOCUMENTS

| | | | | |
|---|---|---|---|---|
| 5,864,662 | A * | 1/1999 | Brownmiller et al. ......... 714/43 |
| 6,055,561 | A * | 4/2000 | Feldman et al. ............ 709/200 |
| 6,131,112 | A * | 10/2000 | Lewis et al. ............... 709/207 |
| 6,331,983 | B1 | 12/2001 | Haggerty et al. ........... 370/400 |
| 6,526,054 | B1 * | 2/2003 | Li et al. ................... 370/390 |
| 6,629,106 | B1 * | 9/2003 | Narayanaswamy et al. ....... 1/1 |
| 6,636,895 | B1 * | 10/2003 | Li et al. ................... 709/238 |
| 6,697,791 | B2 * | 2/2004 | Hellerstein et al. ........... 706/47 |
| 6,744,739 | B2 * | 6/2004 | Martin ..................... 370/254 |
| 6,795,433 | B1 * | 9/2004 | Li ......................... 370/389 |
| 6,914,907 | B1 * | 7/2005 | Bhardwaj et al. ........... 370/432 |
| 6,950,424 | B2 * | 9/2005 | Galand et al. .............. 370/351 |
| 7,006,506 | B1 * | 2/2006 | Naik ....................... 370/397 |
| 7,027,448 | B2 * | 4/2006 | Feldmann et al. ........... 370/401 |
| 7,043,661 | B2 * | 5/2006 | Valadarsky et al. ............ 714/4 |
| 7,131,037 | B1 * | 10/2006 | LeFaive et al. ............... 714/46 |
| 7,293,287 | B2 * | 11/2007 | Fischman et al. ............ 726/22 |
| 7,310,335 | B1 * | 12/2007 | Garcia-Luna-Aceves et al. ................... 370/390 |
| 7,382,781 | B1 * | 6/2008 | Sridhar et al. .......... 370/395.21 |
| 7,389,359 | B2 * | 6/2008 | Jain et al. .................. 709/238 |
| 7,450,495 | B2 * | 11/2008 | Guerin et al. ............... 370/217 |
| 7,500,142 | B1 * | 3/2009 | Cowart et al. ................ 714/25 |

(Continued)

OTHER PUBLICATIONS

Smarts; ("Network Protocol Managaer for OSPF User's Guide", 2004);Verson 1.1 pp. 1-98.*

(Continued)

*Primary Examiner*—Ricky Ngo
*Assistant Examiner*—Dewanda Samuel
(74) *Attorney, Agent, or Firm*—Krishnendu Gupta; Joseph D'Angelo

(57) ABSTRACT

A method and apparatus for operating on a system containing a plurality of components in communication using at least one communication protocol is disclosed. The method comprises the steps of representing selected ones of the plurality of components, the relationship among the components and the associated communication protocols, determining a mapping between a plurality of events and a plurality of observable events occurring among the components and among the communication protocols, wherein the mapping is represented as a value associating each event with each observable event, and performing the operation in conjunction with the events and observable events, wherein events associated with the communication protocols are distinguished from events associated with the components. The operations may be selected from the group of monitoring, discovering, managing, analyzing and displaying the components associated with the multicast protocols.

22 Claims, 15 Drawing Sheets

U.S. PATENT DOCUMENTS

| | | | |
|---|---|---|---|
| 2001/0034793 A1* | 10/2001 | Madruga et al. | 709/238 |
| 2002/0051449 A1* | 5/2002 | Iwata | 370/389 |
| 2002/0152185 A1* | 10/2002 | Satish Jamadagni | 706/1 |
| 2003/0046390 A1* | 3/2003 | Ball et al. | 709/224 |
| 2004/0022244 A1* | 2/2004 | Boers et al. | 370/390 |
| 2004/0249610 A1* | 12/2004 | Ohsie et al. | 702/185 |
| 2005/0021742 A1* | 1/2005 | Yemini et al. | 709/224 |
| 2005/0097146 A1* | 5/2005 | Konstantinou et al. | 707/200 |
| 2006/0018333 A1* | 1/2006 | Windisch et al. | 370/432 |

OTHER PUBLICATIONS

Smarts; ( "IP Discovery Guide Supplement for Networking Protocols", 2004); Version 1.1 pp. 1-35.*

SMARTS; ("Event Modeling with the Modeling Language", 1996) SMARTS;pp. 1-19.*

SMARTS; ("InCharge Common Information Model"), Mar. 2003;SMARTS; pp. 1-33.*

SMARTS; ( "InCharge MPLS IP VPN Manager"); Sep. 2002; SMARTS 2002; pp. 1-11.*

* cited by examiner

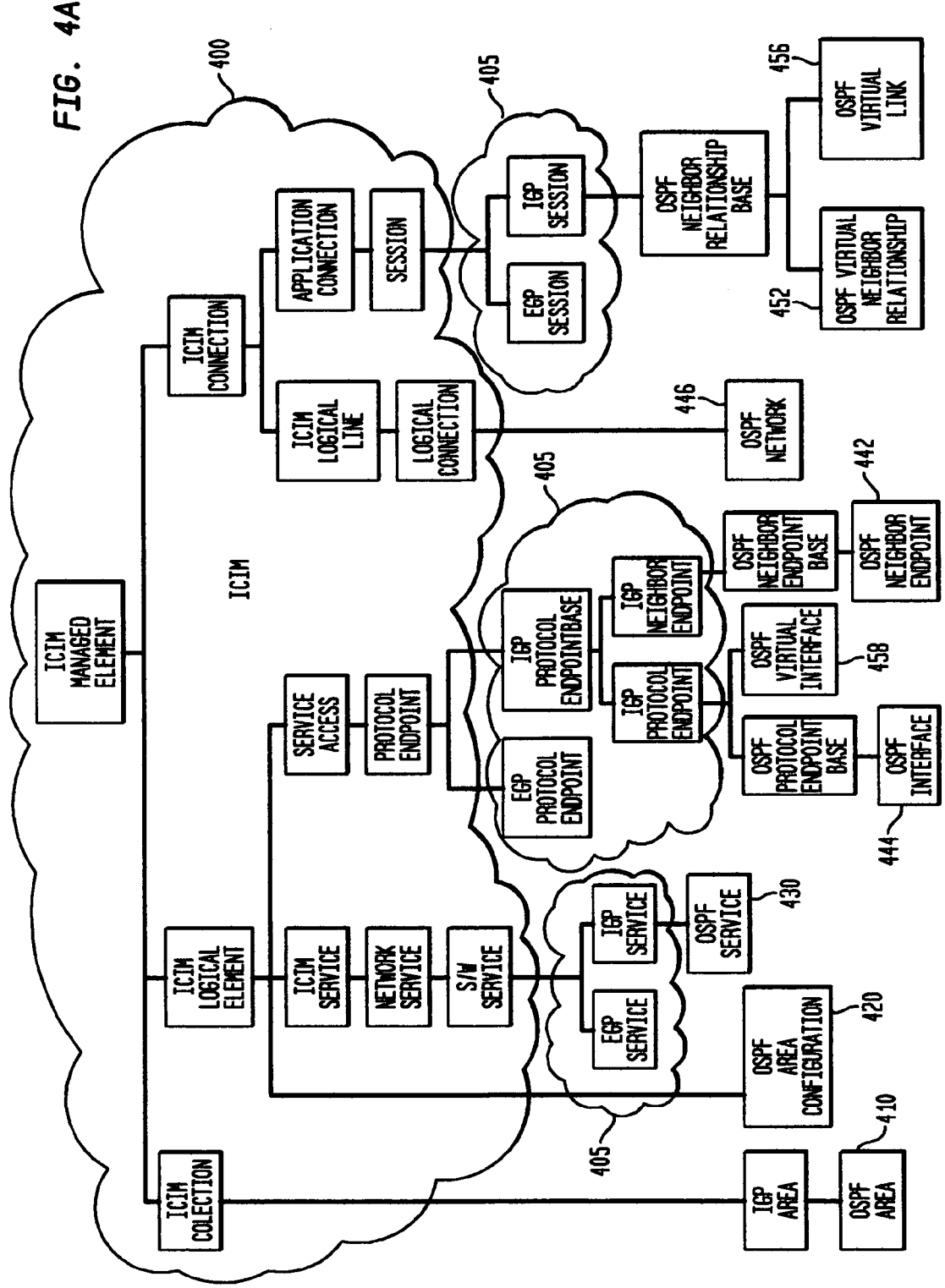

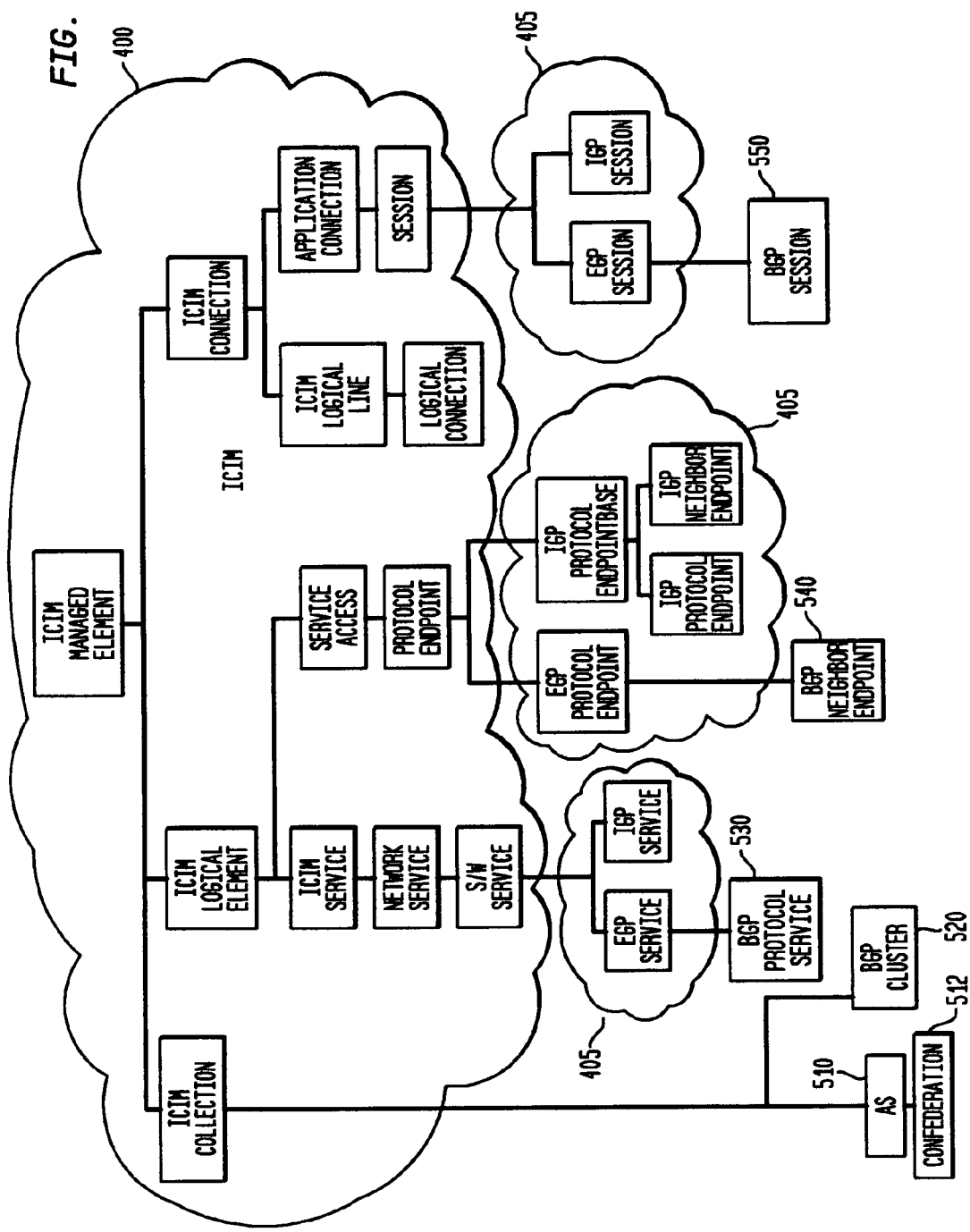

FIG. 6A

| MANAGED ELEMENT | ROOT-CAUSE PROBLEM | CONDITION | SYMPTOMS OF ROOT CAUSE |
|---|---|---|---|
| BGPService | DOWN | THIS BGP SERVICE IS DOWN, AND ALL THE BGP SESSIONS ASSOCIATED WITH THIS SERVICE ARE DOWN | ALL BGP SESSIONS ASSOCIATED WITH THIS SERVICE ARE DISCONNECTED |
| BGPProtocolEndpoint | DISABLED | THIS BGP PROTOCOL ENDPOINT OR ITS ASSOCIATED PHYSICAL INTERFACE IS ADMINISTRATIVELY DOWN (MANUALLY DISABLED), AND THE BGP SESSION FOR THIS ENDPOINT IS REPORTING AN IMPROPER STATE | AdministrativelyDown |
| | | | DISCONNECTED |
| | IBGPPeerMissing | THE INTERNAL BGP (IBGP) PEER (REMOTE IBGP SERVICE) FOR THIS ENDPOINT IS NOT PRESENT IN THE TOPOLOGY, AND THE BGP SESSION FOR THIS ENDPOINT IS REPORTING AN IMPROPER STATE | IBGPPeerMissingEvent |
| | | | DISCONNECTED |
| | RemoteAsMismatch | THE ACTUAL AUTONOMOUS SYSTEM (AS) NUMBER AND THE LOCALLY CONFIGURED AS NUMBER OF THE BGP PEER (REMOTE BGP SERVICE) FOR THIS ENDPOINT DO NOT MATCH, AND THE BGP SESSION FOR THIS ENDPOINT IS REPORTING AN IMPROPER STATE | RemoteASMismatchEvent |
| | | | DISCONNECTED |
| | RemoteSpeakerNotConfigured | THE BGP PEER FOR THIS ENDPOINT IS NOT CONFIGURED TO SPEAK BGP TO THIS ENDPOINT, AND THE BGP SESSION FOR THIS ENDPOINT IS REPORTING AN IMPROPER STATE | RemoteSpeakerNotConfiguredEvent |
| | | | DISCONNECTED |
| | RemoteSystemNotRunningBGP | THE BGP PEER FOR THIS ENDPOINT DOES NOT RUN BGP, AND THE BGP SESSION FOR THIS ENDPOINT IS REPORTING AN IMPROPER STATE | RemoteSystemNotRunningBGPEvent |
| | | | DISCONNECTED |
| BGPSession | DOWN | THE BGP SESSION IS NOT ESTABLISHED, AND NO OTHER KNOWN ROOT CAUSE CAN EXPLAIN WHY THE SESSION IS NOT ESTABLISHED | DISCONNECTED |

FIG. 6B

| MANAGED ELEMENT | SYMPTOM | CONDITION |
|---|---|---|
| BGPProtocolEndpoint | AdministrativelyDown | THIS BGP PROTOCOL ENDPOINT OR ITS ASSOCIATED PHYSICAL INTERFACE IS ADMINISTRATIVELY DOWN (MANUALLY DISABLED) |
| | IBGPPeerMissingEvent | THE IBGP PEER FOR THIS ENDPOINT IS NOT PRESENT IN THE TOPOLOGY |
| | RemoteAsMismatchEvent | THE ACTUAL AS NUMBER AND THE LOCALLY CONFIGURED AS NUMBER OF THE BGP PEER FOR THIS ENDPOINT DO NOT MATCH |
| | RemoteSpeakerNot-ConfiguredEvent | THE BGP PEER FOR THIS ENDPOINT IS NOT CONFIGURED TO SPEAK BGP TO THIS ENDPOINT |
| | RemoteSystemNot-RunningBGPEvent | THE BGP PEER FOR THIS ENDPOINT DOES NOT RUN BGP |
| BGPSession | DISCONNECTED | THE BGP SESSION IS NOT ESTABLISHED |

FIG. 6C1

| MANAGED ELEMENT | ROOT-CAUSE PROBLEM | CONDITION | SYMPTOMS OR ROOT CAUSE |
|---|---|---|---|
| OSPFNetwork | AreaIDMismatch | MISCONFIGURATION SYMPTOMS EXIST ON THIS OSPF NETWORK | AreaIDMismatchSypptom |
| | | | NeighborStateAlarm |
| | AreaTypeMismatch | MISCONFIGURATION SYMPTOMS EXIST ON THIS OSPF NETWORK | AreaTypeMismatchSymptom |
| | | | NeighborStateAlarm |
| | AuthKeyMismatch | MISCONFIGURATION SYMPTOMS EXIST ON THIS OSPF NETWORK | AuthKeyMismatchSymptom |
| | | | NeighborStateAlarm |
| | AuthTypeMismatch | MISCONFIGURATION SYMPTOMS EXIST ON THIS OSPF NETWORK | AuthTypeMismatchSymptom |
| | | | NeighborStateAlarm |
| | DuplicateRouterID | MISCONFIGURATION SYMPTOMS EXIST ON THIS OSPF NETWORK | DuplicateRouterIDSymptom |
| | | | NeighborStateAlarm |
| | HelloOrDeadInterval-Mismatch | MISCONFIGURATION SYMPTOMS EXIST ON THIS OSPF NETWORK | HelloOrDeadIntervalMismatchSymptom |
| | | | NeighborStateAlarm |
| | MTUMismatch | MISCONFIGURATION SYMPTOMS EXIST ON THIS OSPF NETWORK | MTUMismatchSymptom |
| | | | NeighborStateAlarm |
| | NetmaskMismatch | MISCONFIGURATION SYMPTOMS EXIST ON THIS OSPF NETWORK | NetmaskMismatchSymptom |
| | | | NeighborStateAlarm |

FIG. 6C2

| MANAGED ELEMENT | ROOT-CAUSE PROBLEM | CONDITION | SYMPTOMS OF ROOT CAUSE |
|---|---|---|---|
| OSPFInterface | DISABLED | THIS INTERFACE OR ITS ASSOCIATED PHYSICAL INTERFACE IS ADMINISTRATIVELY DOWN (MANUALLY DISABLED) AND AT LEAST ONE OSPF ADJACENCY ON THIS INTERFACE IS REPORTING AN IMPROPER STATE | DisabledAdminSymptom |
| | | | NeighborStateAlarm |
| | DOWN | THIS INTERFACE IS OPERATIONALLY DOWN WHEN TWO OR MORE OSPF NEIGHBOR RELATIONSHIPS EXIST ON THIS INTERFACE AND ALL OF THEM ARE DOWN | NeighborStateAlarm |
| OSPFVirtual-Interface | DOWN | THIS VIRTUAL INTERFACE IS OPERATIONALLY DOWN WHEN TWO OR MORE OSPF VIRTUAL LINKS EXIST ON THIS INTERFACE AND ALL OF THEM ARE DOWN | NeighborStateAlarm |
| OSPFNeighbor-Endpoint | UnknownNbma-Neighbor | THE NBMA NEIGHBOR FOR THIS OSPF NEIGHBOR ENDPOINT IS NOT PRESENT IN THE TOPOLOGY | UnknownNbmaNeighbor-Symptom |
| | | | NeighborStateAlarm |
| OSPFVirtual-NeighborEndpoint | UnknownVirtual-Neighbor | THE VIRTUAL NEIGHBOR FOR THIS OSPF VIRTUAL NEIGHBOR ENDPOINT IS NOT PRESENT IN THE TOPOLOGY | UnknownVirtualNeighbor-Symptom |
| | | | NeighborStateAlarm |
| OSPFNeighbor-Relationship -OR- OSPFVirtualLink | DOWN | THIS OSPF LINK BETWEEN NEIGHBORING ENDPOINTS IS DOWN | NeighborStateAlarm |

FIG. 6D1

| MANAGED ELEMENT | SYMPTOM | EVENT | CONDITION |
|---|---|---|---|
| OSPFService | N/A | ABRNotInBackbone | THE ROUTING DEVICE ON WHICH THIS OSPF SERVICE IS RUNNING IS CONFIGURED AS AN AREA BORDER ROUTER (ABR) BUT HAS NO INTERFACES CONNECTED TO THE BACKBONE AREA |
| OSPFNetwork | N/A | DRElectionFailure | NO DESIGNATED ROUTER (DR) HAS BEEN ELECTED ON THIS BROADCAST OR NMBA NETWORK |
|  | N/A | RouterPrioritiesZero | NO ROUTING DEVICE ON THIS BROADCAST OR NMBA NETWORK HAS A PRIORITY GREATER THAN 0 |
| OSPFInterface | DisabledAdmin-Symptom | N/A | THIS OSPF INTERFACE OR ITS ASSOCIATED PHYSICAL INTERFACE IS ADMINISTRATIVELY DOWN (MANUALLY DISABLED), AND OSPF ADJACENCIES EXIST ON THIS INTERFACE |
| OSPFInterface -OR- OSPFVirtual-Interface | AreaIDMismatch-Symptom | N/A | AN AREA ID MISCONFIGURATION EXISTS ON THIS INTERFACE, PROPAGATED FROM OSPF NEIGHBOR RELATIONSHIPS |
|  | AreaTypeMis-matchSymptom | N/A | AN AREA TYPE MISCONFIGURATION EXISTS ON THIS INTERFACE, PROPAGATED FROM OSPF NEIGHBOR RELATIONSHIPS |
|  | AuthKeyMis-matchSymptom | N/A | AN AUTHENTICATION KEY MISCONFIGURATION EXISTS ON THIS INTERFACE, PROPAGATED FROM OSPF NEIGHBOR RELATIONSHIPS |
|  | AuthTypeMis-matchSymptom | N/A | AN AUTHENTICATION TYPE MISCONFIGURATION EXISTS ON THIS INTERFACE, PROPAGATED FROM OSPF NEIGHBOR RELATIONSHIPS |
|  | DuplicateRouter-IDSymptom | N/A | A DUPLICATE ROUTER ID MISCONFIGURATION EXISTS ON THIS INTERFACE, PROPAGATED FROM OSPF NEIGHBOR RELATIONSHIPS |

FIG. 6D2

TABLE 3: SYMPTOMATIC EVENTS DETECTED BY NETWORK PROTOCOL MANAGER FOR OSPF (CONTINUED)

| MANAGED ELEMENT | SYMPTOM | EVENT | CONDITION |
|---|---|---|---|
| OSPFInterface -OR- OSPFVirtual-Interface (continued) | HelloOrDeadInterval-MismatchSymptom | N/A | A HELLO OR DEAD INTERVAL MISCONFIGURATION EXISTS ON THIS INTERFACE, PROPAGATED FROM OSPF NEIGHBOR RELATIONSHIPS |
| | MTUMismatchSymptom | N/A | AN MTU MISCONFIGURATION EXISTS ON THIS INTERFACE, PROPAGATED FROM OSPF NEIGHBOR RELATIONSHIPS |
| | NetmaskMismatchSymptom | N/A | A NETMASK MISCONFIGURATION EXISTS ON THIS INTERFACE, PROPAGATED FROM OSPF NEIGHBOR RELATIONSHIPS |
| OSPFNeighbor-Endpoint | UnknownNbma-NeighborSymptom | N/A | AN NBMA NEIGHBOR MISCONFIGURATION EXISTS ON THIS OSPF NEIGHBOR ENDPOINT |
| OSPFVirtual-NeighborEndpoint | UnknownVirtual-NeighborSymptom | N/A | A VIRTUAL NEIGHBOR MISCONFIGURATION EXISTS ON THIS OSPF VIRTUAL NEIGHBOR ENDPOINT |
| OSPFNeighbor-Relationship -OR- OSPFVirtualLink | NeighborStateAlarm | N/A | THE NEIGHBOR OR VIRTUAL NEIGHBOR FOR THIS OSPF LINK IS REPORTING AN IMPROPER NEIGHBOR STATE |

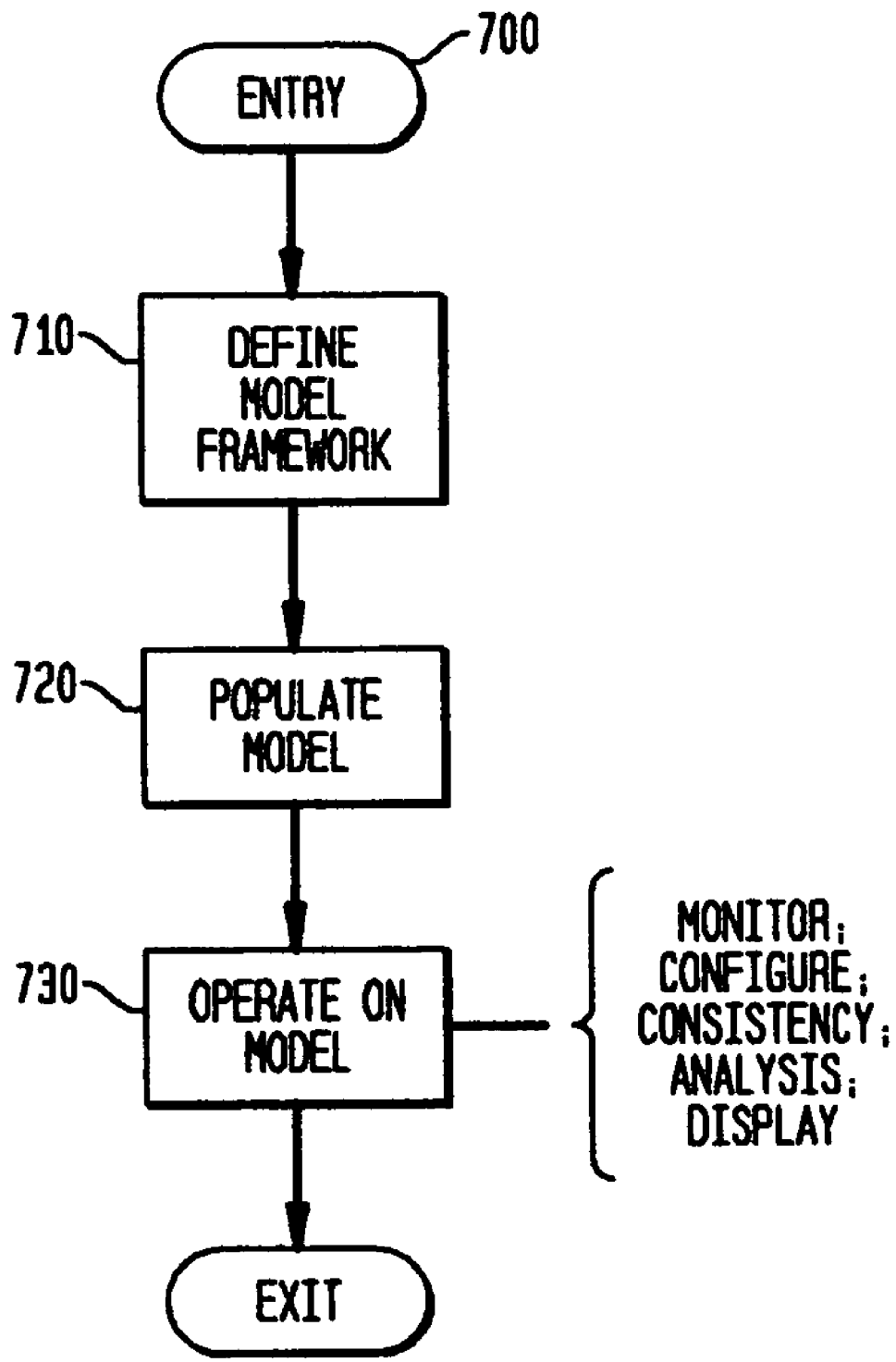

METHOD AND APPARATUS FOR CONFIGURATION AND ANALYSIS OF NETWORK ROUTING PROTOCOLS

CLAIM OF PRIORITY

The instant application claims the benefit, pursuant to 35 USC 119(e), of the earlier filing date of that patent application entitled "Method and System for Model-Based Network Protocol Discovery and Identification," filed in the US Patent Office on Aug. 25, 2004 and afforded Ser. No. 60/604,325, the contents of which are incorporated by reference herein.

RELATED APPLICATION

U.S. patent application Ser. No. 11/211,250, entitled "Method and Apparatus for Configuration and Analysis of Network Multicast Routing Protocols," concurrently filed and U.S. patent application Ser. No. 11/034,192, entitled "Method and Apparatus for Event Correlation and Problem Reporting," filed on Jan. 12, 2005, U.S. patent application Ser. No. 10/400,718, entitled "Method and Apparatus for Event Correlation and Problem Reporting," now U.S. Pat. No. 6,868,367, filed on Mar. 23, 2003; U.S. patent application Ser. No. 08/893,263, entitled "Apparatus and Method for Event Correlation and Problem Reporting," now U.S. Pat. No. 6,249,755, filed on Jul. 15, 1997; U.S. patent application Ser. No. 08/679,443, entitled "Apparatus and Method for Analyzing and Correlating Events in a System Using a Causality Matrix," now U.S. Pat. No. 5,661,668, filed on Jul. 12, 1996; and U.S. patent application Ser. No. 08/249,282; entitled "Apparatus and Method for Event Correlation and Problem Reporting," now U.S. Pat. No. 5,528,516, filed on May 25, 1994, the contents of all of which are incorporated by reference herein.

FIELD OF THE INVENTION

The present invention is related to the field of distributed systems, and more particularly, to the discovery, identification and management of network protocol configurations and operations.

BACKGROUND

Networks, from telephone to the Internet, have continued to expand as businesses have embraced their use in communicating internally among their employees or externally with, or to provide services to, consumers or users. Network technologies, in response, have continued to expand to make network operation more efficient and to allow different networks the means to communicate with and pass information between one another. In one aspect of network technology development, the International Organization for Standardization have developed the Open Source Interface (OSI) architectural model that provides a standardize means for communicating within a network entity or communicating between network entities. The OSI stack is divided into seven layers, which are well-known and comprise a physical layer representing the physical (hardware) and electrical signal implementation, (Layer 1), a data link layer representing the formats used for transmitting data over the network (Layer 2) and a network layer representing the address assignments and packet forwarding methods (Layer 3). The remaining layers, i.e., the upper layers, represent connection and recovery methods, security and authentication methods, representation formations and data interpretation which may include encryption or decryption information.

Network connectivity is enabled not only by the physical connectivity between the devices (layer 1), but also by the routing protocols running on them. Typically routing is an OSI Layer 3 function. Hence, it is not enough to have physical or link (Layer 1 or Layer 2) connectivity between the devices to ensure that devices can properly exchange information. Data packets will only flow via paths defined by the routing protocol, even if the physical connectivity supplies the necessary physical paths. In addition, routing protocol failures may prevent connectivity between nodes, even if the nodes are physically connected.

Network protocol management present significant management challenges as they include a large number of configurable distributed entities that are needed to accomplish consistent operations. Small typographical errors in a single router configuration can have wide-ranging effects. Conventionally, administrators must educate themselves on the proper configuration and operations of installed protocols and their use in networked systems. Backed with knowledge of the installed protocols, administrators, typically, must manually adapt or customize the network configurations and monitor operations to assure proper functionality and correct operation. When hardware and/or software elements (e.g., devices, cards, drivers, applications, new protocol entities, etc.) are added to, removed from, or reconfigured in the network, the changed network condition requires the adjustment of the associated protocol entities. The challenge to configure and manage the network is exacerbated when the network size grows to hundreds and even thousands of elements or devices. Continued adjustment of the protocol entities requires significant skill, effort and time on the part of the network administrator. Even with diligent effort on the part of a skilled network administrator, an error introduced during the network setup or subsequent reconfiguration or adjustment may render inoperative portions of, or even the entire, network for unacceptable lengths of time.

In addition, when errors in the network occur, the error may be caused by an error in the protocol configuration (i.e., a misconfiguration) or by failures in the underlying hardware or software. In the former case, the alarms, associated with the error, are generated in the network layer, whereas in the latter case, the alarms, associated with the error, are generated in a lower layer and propagated through the network layer. For example, protocol failures may impact Service Level Agreements when protocol entities fail to communicate or devices fail to communicate with each other through the proper exchange of routing information or establish new and/or alternate paths. However, a physical connectivity failure may also indicate one or more protocol failures. In this case, a failure of a node that is responsible for the exchange of routing information between two networks will generate failure alarms for the failed physical node and an failure in the associated protocol.

To determine misconfigurations or to distinguish misconfigurations from physical or other logical failures, management solutions must have the ability to analyze configurations of all entities participating in the protocol, with an understanding of the different roles these entities (physical and logical) play in the protocol itself. As protocol events or alarms may be due to events (causing events) that happened in other components or other realms or domains of a system there is a need to correlate events in the other realms with events in the routing protocol realm. Hence, it is important that a comprehensive analysis of protocol configuration and operation be performed as routing protocol failures cannot be analyzed in isolation and the determination of the reason for the failure must be correlated with Layer 1 and Layer 2 failures in order to reach the root problem underlying the observed or detected alarms (symptoms).

Hence, there is a need in the industry for a method and apparatus that can automate the management of the configuration and operation of the network layer and further determine the root-cause of alarms generated at different levels of the network.

SUMMARY OF THE INVENTION

A method and apparatus for operating on a system containing a plurality of components communicating using at least one communication protocol is disclosed. The method comprises the steps of representing selected ones of the plurality of components, the relationship among the components and the associated communication protocols, determining a mapping between a plurality of events and a plurality of observable events occurring among the components and among the communication protocols, wherein the mapping is represented as a value associating each event with each observable event and performing the operation in conjunction with the events and observable events, wherein events associated with the communication protocols are distinguished from events associated with the components.

BRIEF DESCRIPTION OF THE DRAWINGS

FIG. 4A illustrates a model-based class hierarchy of OSPF-based protocols in accordance with the principles of the invention;

FIG. 5A illustrates a model-based class hierarchy of BGP-based protocols in accordance with the principles of the invention;

FIGS. 6A-6D illustrate exemplary diagnostic analysis of BGP and OSPF-based protocols in accordance with the principles of the invention;

FIG. 7A illustrates a flow chart of an exemplary process in accordance with the principles of the invention;

Figure 1:
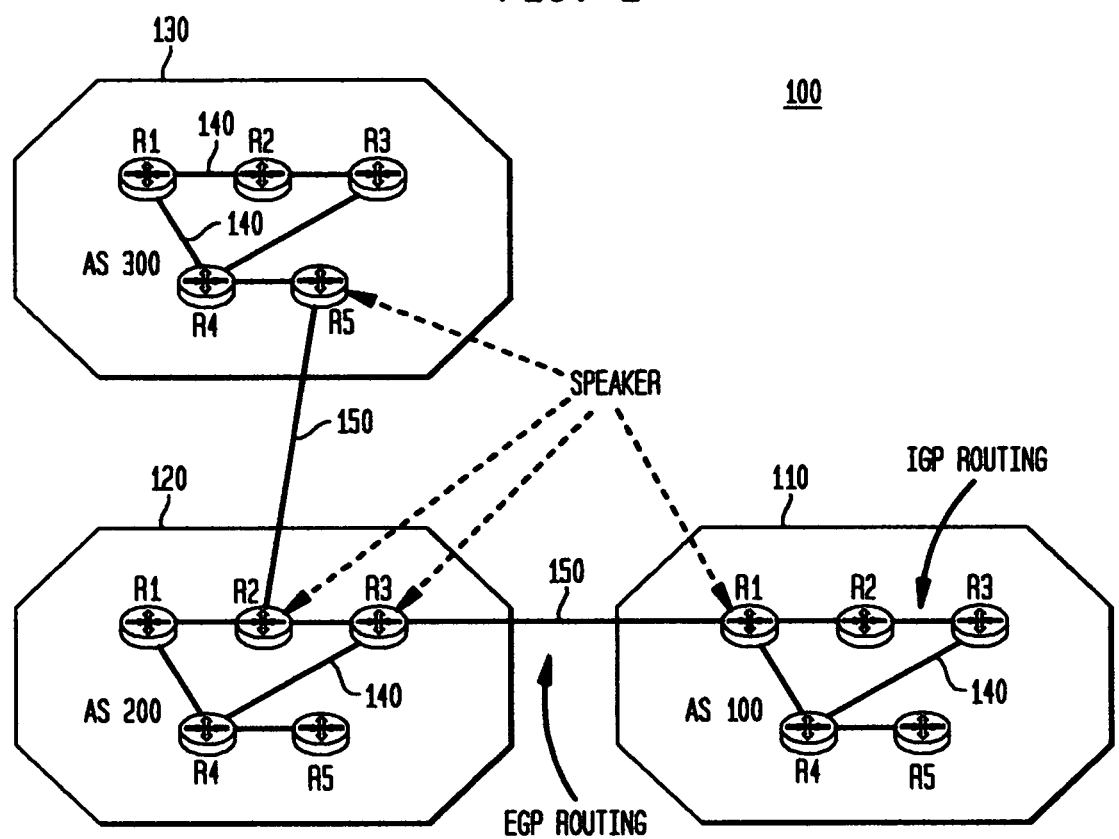
FIG. 1 illustrates a conventional network employing internal and external protocol links.

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements.

DETAILED DESCRIPTION

Networks are typically segmented into convenient physical or logic Autonomous System (AS), which independently administer components of the networked system. Such segmentation is necessary in part to spread the burden of the management system to a plurality of manageable systems.

Segmentation of the network requires that the routing protocols differ on whether the routing information is exchanged within or between Autonomous Systems. There are essentially two types of routing protocols used: Interior Gateway Protocol (IGP) and Exterior Gateway Protocol (EGP). IGPs are used to exchange information within an AS. Examples of this protocol include Open Shortest Path First (OSPF) and Intermediate System-to-Intermediate System IS-IS protocols. EGPs are used to exchange information between Autonomous Systems. The Border Gateway Protocol (BGP) is an example of an EGP.

FIG. 1 illustrates the different types of protocol links that connect devices at the network layer (Layer 3). It would be recognized, by those skilled in the art, that these links represent logical links and do not necessarily represent the underlying physical link(s) connecting the nodes.

In this illustrated case, the system or network 100 comprises three Autonomous Systems, 110, 120, 130. Each AS further consists of five routers, R1, R2, R3, R4 and R5. The IGP links are represented as links 140 between the nodes (i.e., routers, R1, R2, R3, R4 and R5) within an AS whereas the EGP links are represented as links 150 between routers of the different ASs 110, 120, 130. The routers providing communication link between the Autonomous Systems are referred to as speaker devices and, in this illustrative network example are represented as R1 in AS 110, R2 and R3 in AS 120 and R5 in AS 130.

Link state protocols maintain information about all the IP subnets and routers in an AS or an area of an AS (i.e., area), to which it belongs. Although not shown, a designation of an area within an AS is well known and need not be discussed in detail herein. It would also be known to those skilled in the art that an IGP link protocol may be used within an AS area and that a BGP may be used between areas within the AS. In the exemplary network configuration shown, each Autonomous System 110, 120, 130 advertises its presence on the network by using known messages using a BGP. Fore example, AS 130 and AS 110 advertise their respective networks to AS 120 via BGP. However, the routers or nodes R1 . . . R5 in an AS communicate via an IGP link state protocol, e.g., OSPF.

OSPF typically partitions a larger AS into contiguous areas as each maintains complete routing information of the associated area. In any AS, there must be one specially designated area 0 or the backbone area. If the AS has only one area, then this area is area 0. For AS's with more than one area, all areas must be connected to the backbone area.

Figure 2:
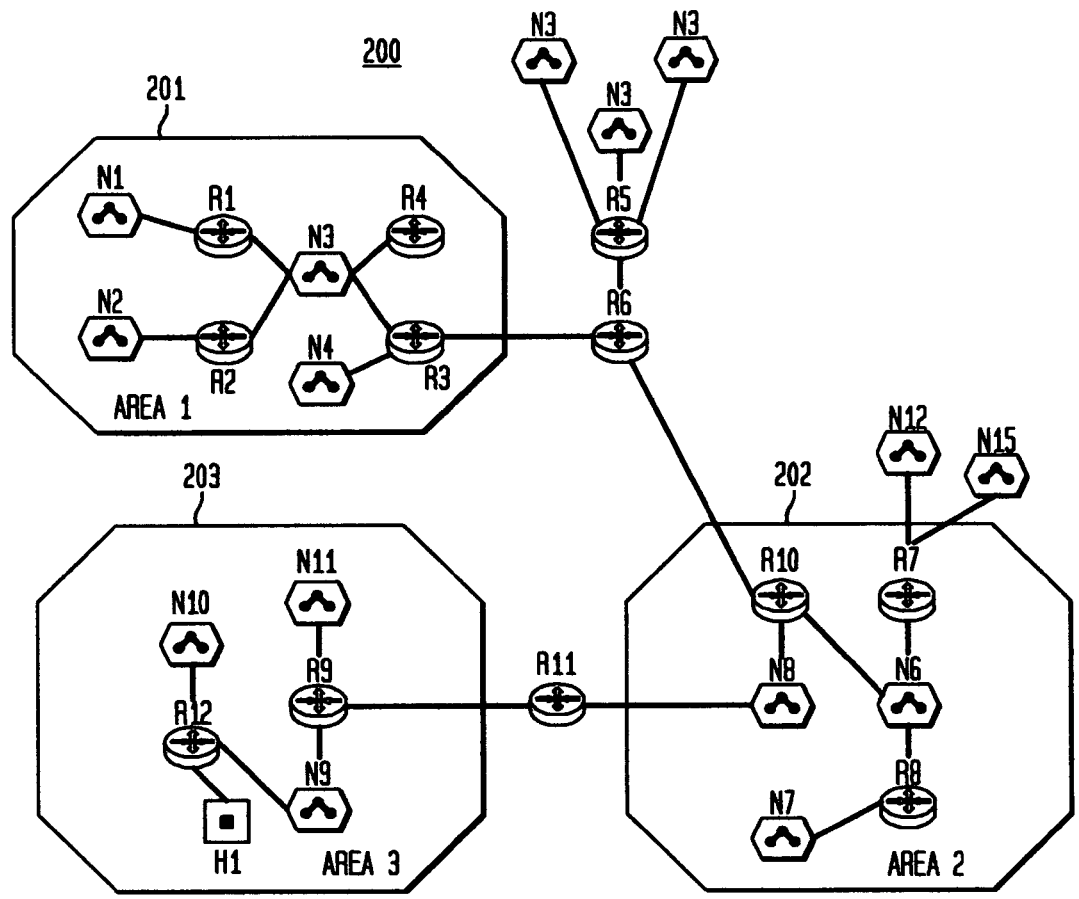
FIG. 2 illustrates a conventional OSPF network configuration.

FIG. 2 illustrates the areas of an AS running OSPF. In OSPF, an area is more precisely defined as a set of IP subnets; each subnet belongs to one and only one area. Every network device is either a member of the backbone area or a member of the area delineated.

In the OSPF protocol, a router that has all of its interfaces in a single area is considered to be part of that area. For example, node R12 is included of Area 3, 203, because all of its interfaces connect to networks in Area 3. Similarly, R5 has all its interfaces to networks N3 in the backbone area (Area 0) so it is referred to as a backbone router. On the other hand, R10, in Area 2, 202, has interfaces to network N6 and N8 in Area 2, 202 and to router R6 in the backbone area (Area 0). R10 is referred to as an Area Border Router (ABR). An ABR is considered part of the backbone area. Router R11 is a special case as it includes interfaces in both Area 2, 202, and Area 3, 203, but does not include interfaces in Area 0. Router R11 is referred to as an ABR.

An OSPF router may be designated as an Autonomous System Border Router (ASBR) when it advertises networks which reside outside the AS using OSPF. For example, a router which is running BGP and importing routes from another AS via EBGP might advertise the discovered routes using OSPF. R10 may hence serve as both an ABR and an ASBR.

In order to enable the construction of OSPF network maps each router provides information to all neighboring interfaces. The information includes its interfaces, the connected networks, and any other information that it obtains from its neighbors. An OSPF router discovers its neighbors either by using the well-known OSPF Hello protocol or by manual configuration of networks. A router enters into a neighbor relationship with each discovered or configured neighbor. The neighbors pass routing information to one another so that all routers can form similar network maps.

The ABR summarizes all the connected IP subnets and external routes in the non-backbone area, and advertises them to the backbone as if they were directly connected to the ABR. Similarly the ABR summarizes all backbone advertised routes to the connected non-backbone areas.

The Border Gateway Protocol (BGP) is an EGP protocol used by the ABR to provide communication over a public network, such as the Internet, to exchange routing information between any two ASs, or independently administered networks. Users of BGP need to control how routes to their networks are advertised to the Internet at large.

The purpose of BGP is to allow different organizations to communicate external routing information to one another. Each organization can administer routing within its AS to meet its needs; typically with the use of an IGP such as OSPF. At the boundaries of the AS summary information about the networks within the AS are advertised to neighboring ASs so that the neighbors know what IP networks are supported by the AS.

With reference to FIG. 1, AS 130 can use BGP to advertise its own network to another AS, e.g., 120. In addition, BGP can be used as a transit through an AS to advertise routes to and from other ASs. For example, AS 120 can advertise the routes it received from AS 110 to AS 130. In this way, AS 120 can provide transit service from AS 110 to AS 130.

Every BGP link described thus far connect two ASs and are known as External BGP (EBGP) links. While these links are sufficient to communicate external routing information between ASs, it is also necessary to communicate this externally derived information within the AS. For this purpose, BGP supports Internal BGP (IBGP) links within an AS.

Figure 3:
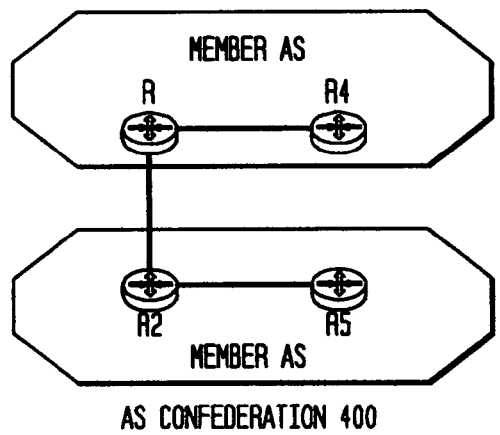
FIG. 3 illustrates a conventional BGP network configuration.

FIG. 3, illustrates an exemplary AS Confederation as a collection of member ASs, wherein the member ASs within the confederation use EBGP (External BGP) to communicate with one another.

An exemplary framework for modeling common objects, relationships, behaviors, and interactions associated with protocol entities is now discussed in accordance with the principles of the invention. Although the invention describes and illustrates a specific model, the principles of the invention are applicable to any modeling approach and are not limited by the model proposed or by the specific proposed modeling approach. In the models are that presented, the names assigned to the classes reflect the BGP and OSPF entities being represented and are used for illustrative purposes only.

FIGS. 4A-4B and 5A and 5B, respectively, illustrate exemplary embodiments of an abstract model in accordance with the principles of the present invention for OSPF and BGP protocols. The model shown is an extension of known network models, such as the SMARTS® InCharget™ Common Information Model (ICIM) 400, or similarly defined or pre-existing CIM-based model. SMARTS and Incharge are trademarks of EMC Corporation, Inc., having a principle place of business in Hopkinton, Ma, USA. This model is an extension of the DMTF/SMI model. Model based system representation is discussed in commonly-owned referred to related US Patents and Patent Applications, the contents of which are incorporated by reference herein.

In this exemplary embodiment, the base model selected 400 is first extended to accommodate the inclusion of Internal (IGP) and External (EGP) protocols by incorporating objects for distinguishing and processing the different protocols. These objects are grouped or encapsulated in entities 405. As these objects are used to distinguish between IGP and EGP process, it would be appreciated that they are not necessary for the processing associated with the identification and management of the specific internal or external protocols. Hence, they need not be described in detail herein.

As would further be appreciated, the objects and relationships described herein are independent of the specific network configuration (i.e., configuration non-specific) and present parameters or attributes of the components or operations comprising the network.

FIG. 4A illustrates an exemplary model-based 400 class hierarchy for entities or devices using IGP OSPF protocol. In this case, OSPF_Area object 410 contains OSPF_ProtocolService objects which are abstract representations of the OSPF process on each device. Each OSPF ProtocolService 430 has it own view of each OSPF_Area 410 in which it participates and this is modeled by the OSPF_AreaConfiguration object 420. The OSPF ProtocolService contains OSPF Interfaces 444 and OSPF VirtualInterfaces 458 which are connected to each other via OSPF Networks 456. Each OSPF Interface 444 participating in an OSPF Network 456 forms an OSPF NeighborRelationship 452 with neighboring OSPF_Interfaces 444. The OSPF NeighborEndpoint 440 models the OSPF NeighborRelationship 452 from the point of view of each of the two participating OSPF_Interfaces 444.

An OSPFArea 410 represents a set of IP subnets within an autonomous system (AS). If more than one OSPF area is configured for an AS, one of the areas is designated the backbone area (Area 0). All non-backbone areas within an AS have a physical connection to the backbone area. Attributes of OSPFArea 410 are at least an area identification, an IP Address and an Area type. An OSPF area configuration object 420 represents an OSPF area as configured from the viewpoint of one of the routing devices running an OSPF service. Each routing device has its own view of the area's attributes. An OSPFService object 430 represents an OSPF protocol process running on a routing device. An OSPFSservice object manages the protocol exchanges with other OSPF services. An OSPFNetwork object 446 represents a collection of routing devices running OSPF services on an IP network. An OSPFInterface 444 is a logical interface, associated with an underlying IP interface that participates in the OSPF protocol exchange. An OSPFVirtualInterface object 458 represents a virtual interface associated with an underlying IP interface that participates in the OSPF protocol exchange. A virtual interface is associated with a virtual link, represented by object OSPFVirtualLink 456, which is used to link an OSPFArea 410 that does not have a physical connection to the backbone area (Area 0). The virtual link is established between two ABRs having a common OSPF area, and one ABR is connected to the backbone area. An OSPFNeighborEndpoint 442 represents a type of service access point defined for each OSPF interface on the host routing device. An OSPFNeighborEendpoint 442 represents a logical element that holds the status of a single OSPF neighbor relationship from the point of view of one of the OSPF interfaces. An OSPFVirtualNneighborEndpoint 452 represents a type of service access point defined for each OSPF virtual interface on the host routing device. An OSPFVirtualNeighborEndpoint object is a logical element that holds the status of a single OSPF virtual link from the point of view of one of the OSPF virtual interfaces. An OSPF neighbor relationship represents a link between two OSPF neighbor endpoints. Each complete OSPF neighbor relationship connects two OSPF neighbor endpoints. An OSPFVirtualLink represents a link between two OSPF virtual neighbor end points. Each complete OSPF virtual link connects two OSPF virtual neighbor endpoints.

Figure 4B:
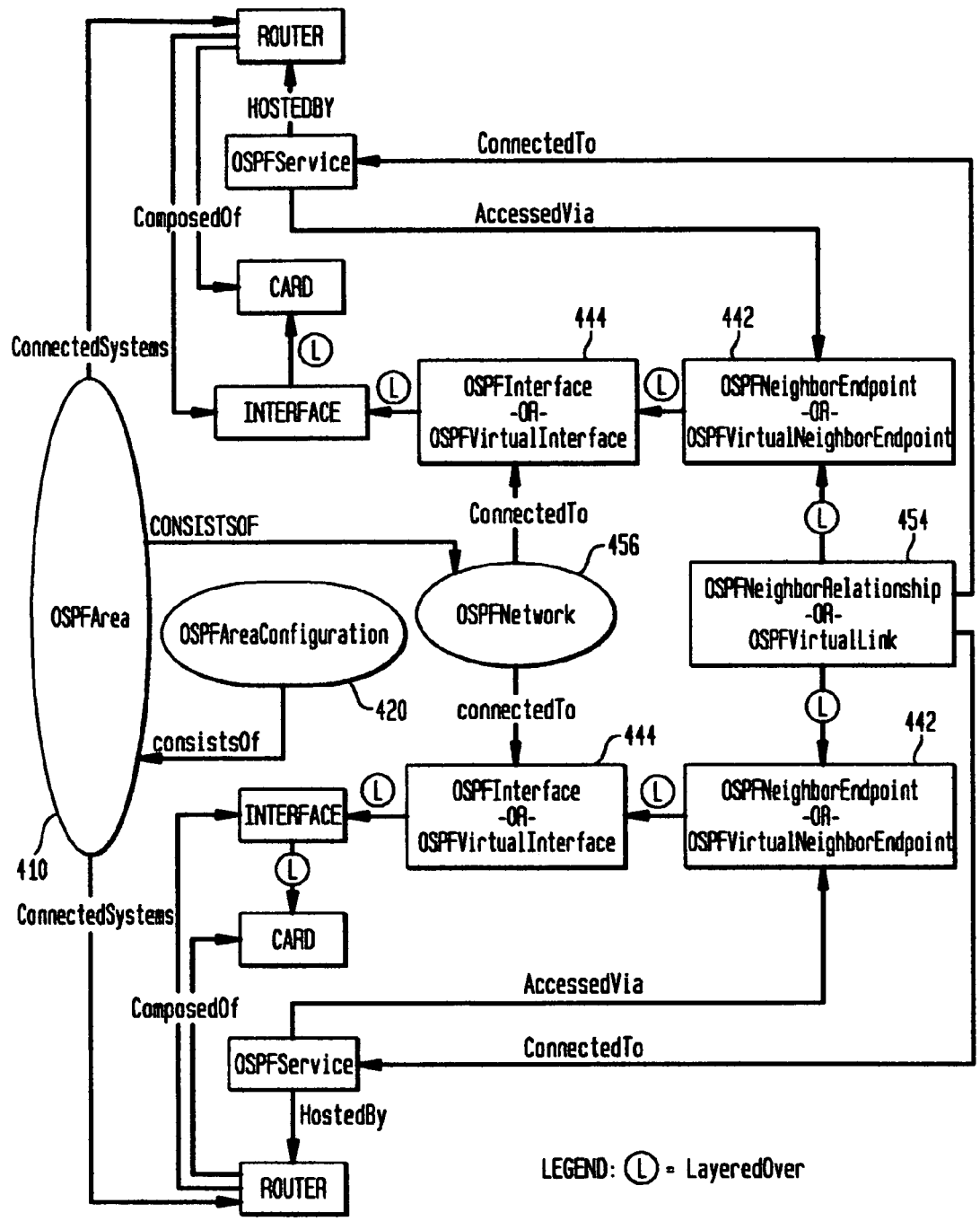
FIG. 4B illustrates a representation of the OSFP model-based hierarchy in relation to associated physical element.

FIG. 4B illustrates the relationships between the OSPF model objects shown in FIG. 4A. For example, the object OSPFNetwork 456 possesses a "connected to" relationship with OSPFInterface 444 and OSPFVirtualInterface 458 objects. As would be appreciated, and not shown, reciprocal relationships between the modeled objects also exist.

FIG. 5A illustrates an exemplary model-based class hierarchy 500 for entities or devices utilizing BGP. In this case, a AS object 510 contains BGP_ProtocolService objects 530 which are representations of the BGP process on each device. A AS 510 may be a BGP Confederation 512 containing other BGP AS. The BGP_ProtocolService 530 contains BGP NeighborEndpoints 540 connected to one another via BGP_Session objects 550.

A BGP AS 510 objects consist of one or more routing devices running BGP services. The AS object 510 contains attributes of an identifier associated with or number of the autonomous system being monitored and a Conferation identifier which identifies BGP confederation number to which the BGP autonomous system is a member. A BGP service 530 represents a BGP protocol process running on a routing device. The BGP service manages the protocol exchanges with other BGP services. Any BGP service that forms a session with any other BGP service is referred to as a BGP speaker. BGP service and BGP speaker are essentially the same terms. Attributes of the BGPService object are at least an AS identifier, a routing identifier that uniquely identifies the routing device that the BGP service is running on. A BGPProtocolEndpoint object 540 is a type of service access point defined for each BGP physical interface on the BGP routing device. A BGPProtocolEndpoint object is a logical element that holds the status of a single BGP session from the point of view of one of the BGP physical interfaces. A BGP session is a connection between the local BGP service running on the local routing device and a remote BGP service running on a remote routing device. The remote BGP service running on the remoter routing device is also known as the BGP peer. A BGPSession object 550 represents a link between two BGP protocol endpoints. Each complete BGP session connects two BGP protocol endpoints.

Figure 5B:
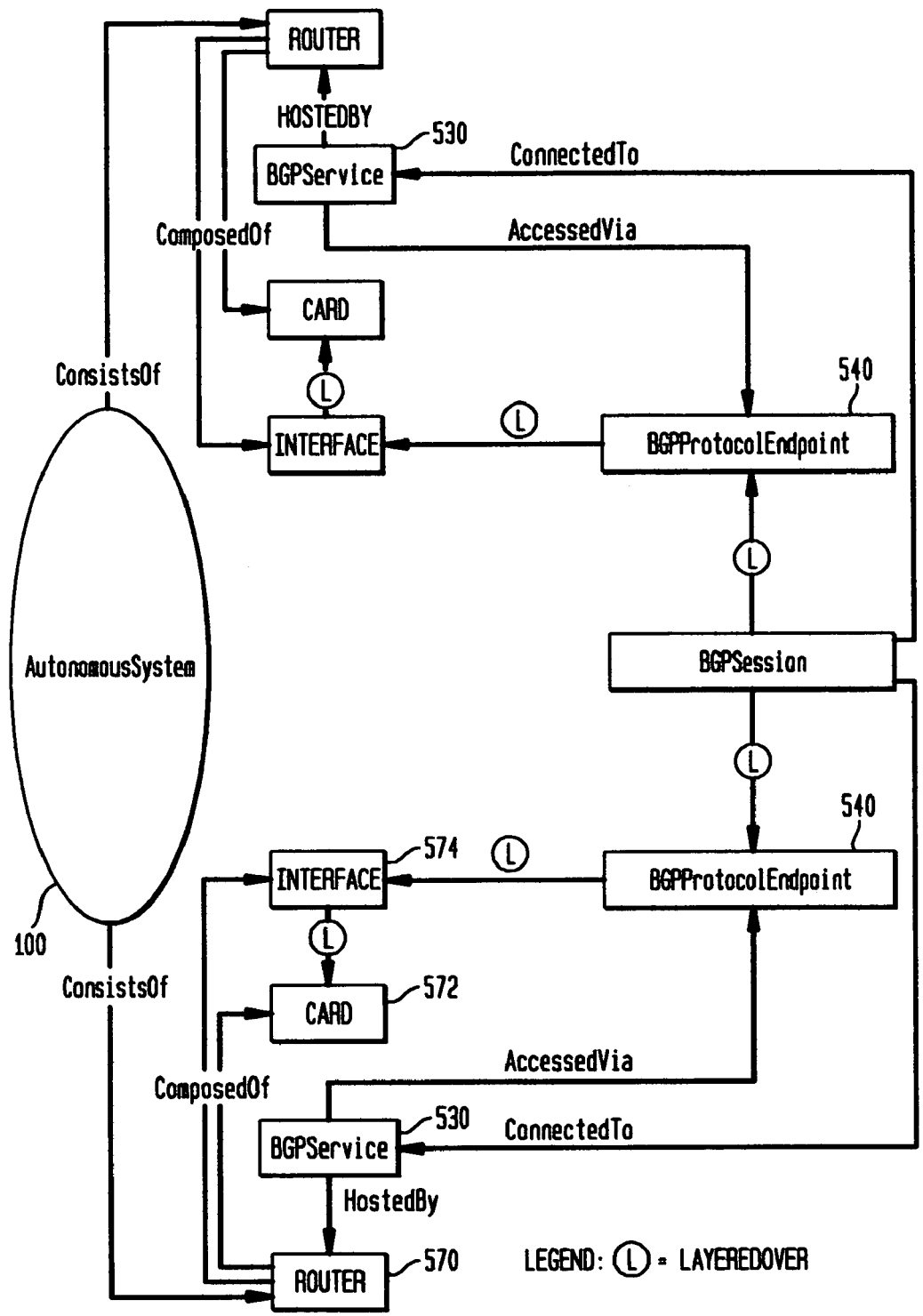
FIG. 5B illustrates a representation of the BGP model-based hierarchy in relation to associated physical element.

FIG. 5B illustrates the relationships between the modeled objects of the BGP interface accordance with the principles of the invention. For example, a BGPService 530 is hosted by a router 570 (a physical entity) which possesses a "composed-of" relationship with cards 572 and interfaces 574, while the interface 574, is contained on or "layered-over" an associated card. The BGPProtocolEndpoint object 540 is layered-over the physical aspects of interface 574. As would be appreciated, and not shown, reciprocal relationships between the modeled objects.

In one aspect of the invention, several forms of instrumentation may be used to acquire information about the networked system being modeled. For example, the objects of the protocol model may rely on one or more of the following sources of information to acquire information to populate object, relationship, behavior, and interaction instances of the modeled objects: SNMP MIBs (Management Information DataBase), for network devices, OSPF MIBs to obtain information about OSPF specific entities, BGP MIBs to obtain information about BGP specific entities, Command Line Interface (CLI) at the network devices, e.g., Show commands, and protocols that are associated with specific elements (e.g., BGP AS confederations that are not represented in the BGP MIB). In addition there are BGP configuration parameters such as source IP address which are not always available from the BGP MIB. These entities are optionally discovered by probing router configurations via CLI and router topology information including Layer 1, Layer 2, and Layer 3 connectivity.

Each device which has been discovered in the topology may be further probed to determine which protocols are supported. For each supported protocol, a deeper discovery may then be performed. For example, if a device is determined to support OSPF, the OSPF MIB may be probed to determine: OSPF interfaces on the devices; to which OSPF networks the device connects; to which OSPF area the devices participates in, etc.

In one aspect of the invention, periodic polling and asynchronous event processing may be used to monitor the state of OSPF neighbor relationships and BGP sessions by polling the standard SNMP OSPF and BGP MIBs. Synchronous SNMP traps or syslog messages are parsed so that the information may be used to update the defined model. In this aspect of the invention information regarding devices that are experiencing connectivity failures may be collected. Remote unicast point, multicast ping, and remote traceroute information may also be used to collect desired information.

In one aspect of the invention, the information collected may be used to perform operations on the model. For example, root cause analysis of problems that may occur may be determined based on the modeled system. In a preferred method of performing a root cause analysis, a correlation, which is disclosed in the above referred to commonly-owned related US Patents and Patent Applications may be used. However, other methods or strategies (e.g., rule based) could be employed as well.

FIGS. 6A-6D illustrate exemplary diagnostic analysis tables associated with BGP and OSPF protocols in accordance with the principles of the invention. FIG. 6A illustrates exemplary root-causes of errors in a BGP communication protocol. In this exemplary presentation, an observed event such as "all BGP sessions associated with service are disconnected" provides an indication that the root cause is the service represented by the BGPService object is down or not operational. FIG. 6B illustrates additional symptomatic events and the managed components that may be used to determine a root-cause error in a BGP communication protocol. FIG. 6C illustrates exemplary root-causes of errors in an OSPF communication protocol. In this exemplary presentation, an observed event such as "AreaIDMismatchSymptom" may be used to determine that the root cause of the observed event is a misconfiguration exists in the OSPF network. FIG. 6D illustrates additional symptomatic events and the managed components that may be used to determine a root-cause error in a OSPF communication protocol. As would be appreciated information contained in FIGS. 6A-6D may to used to determine a mapping between events and observable events that may be used in an analysis such as root-cause, impact, configuration, etc.

FIG. 7A illustrates a flowchart of an exemplary process 700 of Model-Based Protocol Management (MB-PM) in accordance with the principles of the present invention. In this exemplary process, at block 710, a model framework for the modeling protocol entities, relationships, behaviors and interactions is defined. The model is an abstraction of the underlying hardware and software components. Although the present invention has been described with regard to an ICIM model, andymodeling technique can be applied at this stage. At block 720, the model is populated with protocol entity, relationship, behavior and interaction instances for the managed environment (i.e., modeled system or network). In this case, well-known algorithms, databases and techniques may be applied to retrieve information from the configuration of the instances of the modeled protocol entities to populate the model with the device details discovered, as described previously. Discovery of information may further include the discovery of the types of networks. Those skilled in the art would recognize the discovery may be done automatically or manually.

At block 730, operation on the environment through the instantiated model may be performed. For example, operations may comprise monitoring the underlying protocol entities to verify that the global model is synchronized with the state of the underlying protocol entities, configuring or provisioning the protocol entities, configuring or checking the consistency of the protocol entity configurations, analyzing the state of the protocol entity model to detect configuration errors, global failure modes and health status of the protocol entities, and displaying/visualizing the components, objects and their relationships.

In another aspect of the invention, discovery of the state of introduced or removed components, elements or objects and their relationships, and populating the model after dynamic changes in the protocol entities of the system may be performed. This aspect of the invention may include re-populating protocol entity and relationship instances of the managed environment by using, for example, a series of discovery algorithms and techniques to retrieve information regarding newly introduced, changed, or removed components, objects, or resources instances in the networked system.

Using the MB-PM model in accordance with the principles of the invention, the system can use, preferably the correlation method described in the aforementioned related US Patents and Patent Applications, to correlate the alarms or generated error messages from the devices in the same area and diagnose the failure in a specific router as the root cause. However, other methods or strategies (e.g., rule based) could be employed as well.

For example, to determine one operation, such as root cause of a failure, involving routing protocol the following steps may be executed:

For each failed routing protocol session (OSPF or BGP}
  a. Using a model of the target system and a correlation technique, correlate the failure with other related failures;
  b. Define a problem called "Down" on each protocol entity such as ProtocolService, Interface, and NeighborEndpoint. The symptom of each "Down" failure consists of the set of protocol sessions related to the "Down" device. For example, the symptoms of ProtocolService Down consists of all protocol sessions originating or terminating in that service failing;
  c. Determine a failing entity that best describes or explains the set of failed routing protocol sessions;
  d. Determine whether the failed protocol entity is misconfigured;
  e. If the root cause of the failure is not a misconfiguration, determine whether the failure results from a connectivity failure in the Layers 1-3;
  f. If no root cause has been determined by the prior steps, perform a remote unicast or multicast Layer 3 ping to determine if there is an undetected Layer 3 problem;
  g. If there is an undetected Layer 3 problem and the failed sessions is between non-adjacent protocol entities (such as IBGP peers), perform a remote traceroute to localize the problem to a particular device along the path between protocol entities;
  f. If no other cause of the routing session can be determined, then report the routing session failure itself as the root cause.

In another aspect of the invention, it is possible to determine whether an operation such as global connectivity correctness is achieved. In this aspect of the invention, a search of the routing topology is performed as follows;
  a. Using the model of the routing infrastructure, determine if each OSPF Area is disconnected, singly connected, or bi-connected. Each of these states can be determined in linear time by treating the routing protocol entities as nodes and links between entities as edges in an undirected graph. Then well-known forms depth first search can be used to determine if the graph is disconnected, singly connected or bi-connected. (E.g. see Aho, Hoperoft, and Ullman "The design and analysis of computer algorithms pg. 179-187);
  b. Compare the checksum on the link-state database of each protocol entity within each OSPF area. If the checksums don't match between two entities in the same area, then ensure that the lagging link-state databases converge to the checksum after some time-out period t or else report a convergence failure;
  c. Determine if IBGP topology of each AS implements logical full as follows:
    i. Consider only BGP speakers and sessions within a single AS.
    ii. For each route reflector in the topology, find the "closure" of its client list. That is, find all of its clients, its clients' clients, etc. If a loop is detected then there report a "route reflector loop" event and exit. Call this the "client closure" of the route reflector.
    iii. For each BGP speaker, consider all of its peer speakers (i.e., consider all BPG sessions that are not route reflector client sessions). Calculate its "reachability list" as the list of peer speakers united with the "client closure" of all peer speakers.
    iv. For each route reflector R
      1. For each BGP speaker C in R's "client closure".
        a. Set the new value of the "reachability list" of C to be the union of C's "reachability list" and R's "reachability list"
    v. Each BGP speakers "reachability list" now contains the list of routers that it will receive BGP routes from. If the "reachability list" of any BGP speaker in the area is incomplete, that is, it does not contain all other BGP speakers in the area, then report an error, since a logical full mesh is not implemented by the topology; and
  d. Compare area-wide OSPF configuration parameters to ensure compatibility. For each OSPF area, consider how the area is configured in each router and make sure that all configurations are compatible. For example if an area is defined as a "stub" area, insure that all routers consider the area to be a "stub" area.

Figure 7B:
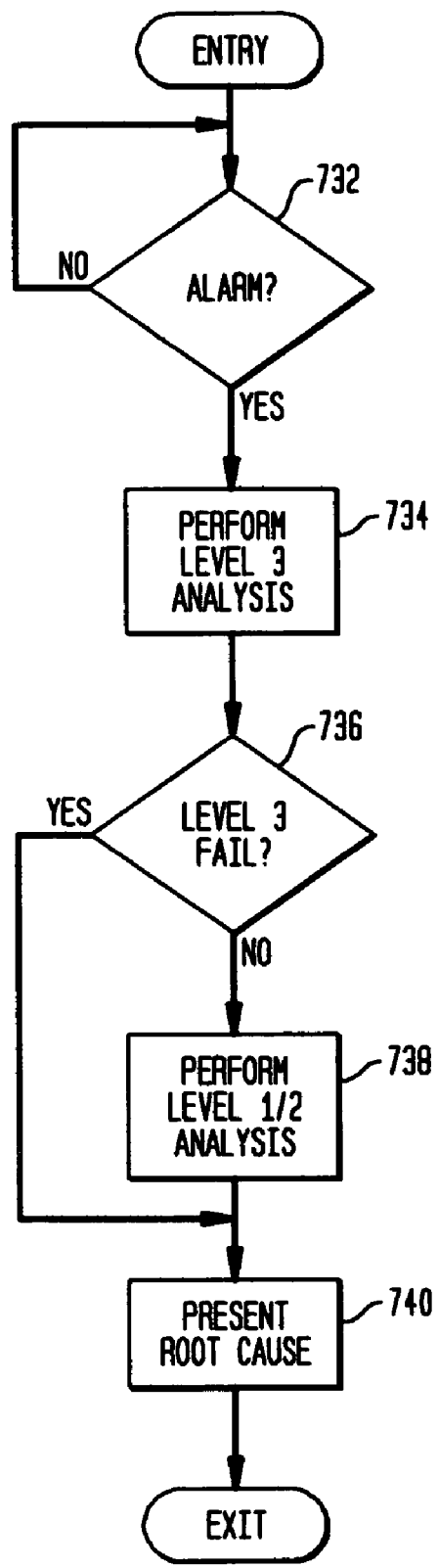
FIG. 7B illustrates a flow chart of a second exemplary process in accordance with the principles of the invention.

FIG. 7B illustrates a flowchart of an exemplary process for operating on the model, block 730 of FIG. 7A, in accordance with the principles of the invention. In this exemplary process, a determination is made at block 732 whether an alarm is detected. If the answer is in the affirmative, a level 3 analysis is performed at block 734. The analysis, for example, may be a root cause analysis using information associated with protocol errors as shown in FIG. 6. At block 736, a determination is made whether the alarm is associated only with a level 3 failure. If the answer is negative, then a level 1/2 analysis is performed at block 738. At block 740, the results of the analysis are presented on a display, for example. The presentation may indicate a Level 3 or a Level 1/2 cause of the generated alarm. Although the process shown herein depicts separate analysis for Level 3 and Level 1/2 alarms, it would be recognized that the analysis may be performed in a single operation.

As would be appreciated by those skilled in the art, the processes describe herein may be performed upon detection of a failure or may be run periodically or whenever a change in the topology occurs.

Although the present invention has been described with regard to network routing protocols and their management challenges focusing on the Internet Protocol (IP) Border Gateway Protocol (BGP) and Internal Gateway Protocol (OGP) protocols, it would be recognized that the principles of the invention described herein are generic and can be applied to other types of routing protocol (e.g., IS-IS or EIGRP). The features and steps enumerated above are provided for purposes of example and illustration only and not for purposes of limitation. Additional features of the embodiments of the present invention will become apparent through the following detailed explanation and the drawings incorporated herein.

For example, the method described herein is suitable for messaging protocols that enable communication among application components in a distributed system. Such protocols are used in the TIBCO messaging, SAP messaging, J2FE messaging (JMS-Java Message Service), Websphere messaging, etc. Similarly, the method described herein is suitable for application protocols operating among application components that include, for example, HTTP, exchanges between web servers and databases, ERP applications, e.g., SAP exchanges, e-mail exchange protocols, etc. Control protocols such as optical network control planes and protocols to allocate resources for Service Level Agreements (SLAB) may also be represented, as well as IPSec (IP Security) and ATM, in accordance with the principles of the invention.

Figure 8:
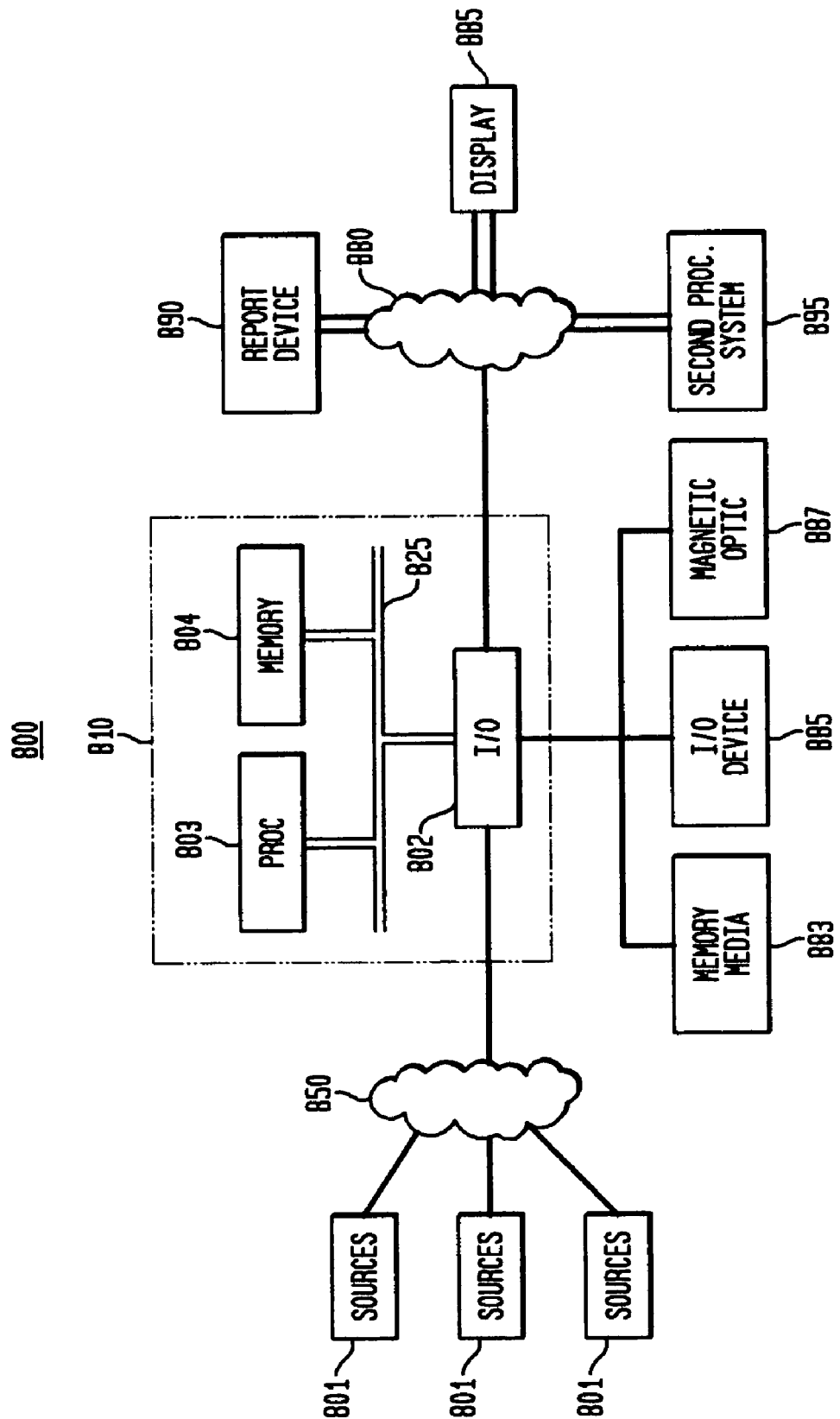
FIG. 8 illustrates an exemplary system for practicing the process discloses herein.

Sample descriptions of protocol presented are provided by way of explanation only. The presented examples are merely for illustrating the principles of the invention and the invention should not be considered to be limited to the examples presented FIG. 8 illustrates an exemplary embodiment of a system 800 that may be used for implementing the principles of the present invention. System 800 may contain one or more input/output devices 802, processors 803 and memories 804. I/O devices 802 may access or receive information from one or more sources or devices 801. Sources or devices 801 may be devices such as routers, servers, computers, notebook computer, PDAs, cells phones or other devices suitable for transmitting and receiving information responsive to the processes shown herein. Devices 801 may have access over one or more network connections 850 via, for example, a wireless wide area network, a wireless metropolitan area network, a wireless local area network, a terrestrial broadcast system (Radio, TV), a satellite network, a cell phone or a wireless telephone network, or similar wired networks, such as POTS, INTERNET, LAN, WAN and/or private networks, e.g., INTRANET, as well as portions or combinations of these and other types of networks.

Input/output devices 802, processors 803 and memories 804 may communicate over a communication medium 825. Communication medium 825 may represent, for example, a bus, a communication network, one or more internal connections of a circuit, circuit card or other apparatus, as well as portions and combinations of these and other communication media. Input data from the client devices 801 is processed in accordance with one or more programs that may be stored in memories 804 and executed by processors 803. Memories 804 may be any magnetic, optical or semiconductor medium that is loadable and retains information either permanently, e.g. PROM, or non-permanently, e.g., RAM. Processors 803 may be any means, such as general purpose or special purpose computing system, such as a laptop computer, desktop computer, a server, handheld computer, or may be a hardware configuration, such as dedicated logic circuit, or integrated circuit. Processors 803 may also be Programmable Array Logic (PAL), or Application Specific Integrated Circuit (ASIC), etc., which may be "programmed" to include software instructions or code that provides a known output in response to known inputs. In one aspect, hardware circuitry may be used in place of, or in combination with, software instructions to implement the invention. The elements illustrated herein may also be implemented as discrete hardware elements that are operable to perform the operations shown using coded logical operations or by executing hardware executable code.

In one aspect, the processes shown herein may be represented by computer readable code stored on or provided by a computer readable medium. The code may also be stored in the memory 804, for example, or may be read or downloaded from memory medium 883, or an I/O device 885 or magnetic or optical media, such as a floppy disk, a CD-ROM or a DVD, 887 and then stored in memory 804. The code may, in one aspect of the invention, be downloaded over one or more of the illustrated networks or provided through I/O device 885. As would be appreciated, the code may be processor-dependent or processor-independent. JAVA is an example of processor-independent code. JAVA is a trademark of the Sun Microsystems, Inc., Santa Clara, Calif. USA.

Information from device 801 received by I/O device 802, after processing in accordance with one or more software programs operable to perform the functions illustrated herein, may also be transmitted over network 880 to one or more output devices represented as display 885, reporting device 890 or second processing system 895.

As one skilled in the art would recognize, the term computer or computer system may represent one or more processing units in communication with one or more memory units and other devices, e.g., peripherals, connected electronically to and communicating with the at least one processing unit. Furthermore, the devices may be electronically connected to the one or more processing units via internal busses, e.g., ISA bus, microchannel bus, PCI bus, PCMCIA bus, etc., or one or more internal connections of a circuit, circuit card or other device, as well as portions and combinations of these and other communication media or an external network, e.g., the Internet and Intranet.

While there has been shown, described, and pointed out fundamental novel features of the present invention as applied to preferred embodiments thereof; it will be understood that various omissions and substitutions and changes in the apparatus described, in the form and details of the devices disclosed, and in their operation, may be made by those skilled in the art without departing from the spirit of the present invention. It would be recognized that the invention is not limited by the model discussed, and used as an example, or the specific proposed modeling approach described herein. For example, it would be recognized that the method described herein may further be used to perform system analysis that may include: fault detection, fault monitoring, performance, congestion, connectivity, interface failure, node failure, link failure, routing protocol error, routing control errors, and root-cause analysis.

It is expressly intended that all combinations of those elements that perform substantially the same function in substantially the same way to achieve the same results are within the scope of the invention. Substitutions of elements from one described embodiment to another are also fully intended and contemplated:

What is claimed is:

1. A method for operating on a system containing a plurality of components communicating using at least one communication protocol, the method comprising the steps of:
   representing, in a non-user accessible manner, selected ones of the plurality of components, the relationship among the components and the associated communication protocols to form a model of the system; wherein the step of representing the at least one communication protocol comprises the steps of: creating at least one non-specific representation of the communication protocols selected from the group consisting of: OSPFArea, OSPFAreaConfiguration, OSPFService, OSPFInterface, OSPFVirtualInterface, OSFPNeighborEndpoint, OSPFNetwork, OSPFNeighborRelationsip and OSFPVirtualLink; wherein the OSPFArea represents a set of IP subnets within the system; and
   determining a mapping between a plurality of events and a plurality of observable events occurring among the components and among the communication protocols, wherein the mapping is represented as a value associating each event with each observable event, and
   performing the operation in conjunction with the events and observable events, wherein the events associated with the communication protocols are distinguished from events associated with the components.

2. The method as recited in claim 1, wherein the protocols are selected from the group consisting of: IGP, EGP, BGP, and OSPF.

3. The method as recited in claim 1, wherein the step of representing the at least one communication protocol comprises the steps of:
   creating at least one non-specification representation of relations along which the events propagate amongst the communication protocols, wherein the representations of relations are selected from the group consisting of: ConnectedSystem, ConsistsOf, ConnectedTo, AccessedVia, HostedBy, ComposedOf and LayeredOver.

4. The method as recited in claim 1, wherein the step of representing the at least one communication protocol comprises the steps of:
   creating at least one non-specific representation of the communication protocols selected from the group consisting of: AS, Configuration, Cluster, BGPService, BGPNewighborEndpoint, BGPSession; and
   creating at least one non-specification representation of relations along which the events propagate amongst the communication protocols, wherein the representations of relations are selected from the group consisting of: ConnectedSystem, ConsistsOf, ConnectedTo, AccessedVia, HostedBy, ComposedOf and LayeredOver.

5. The method as recited in claim 1, where the step of determining a mapping comprises the steps of:
   creating a first mapping of between a plurality of events and a plurality of observable events occurring among the communication protocols; and
   creating a second mapping of between a plurality of events and a plurality of observable events occurring among the components.

6. The method as recited in claim 1, wherein the operation is selected from the group consisting of: monitoring, discovering, managing, analyzing and displaying.

7. The method as recited in claim 6, wherein the analyzing operation is selected from the group consisting of: root-cause, impact, connectivity and performance.

8. An apparatus for operating on a system containing a plurality of components communicating using at least one communication protocol, the apparatus comprising:
   a processor in communication with a memory, the processor executing code for:
      representing, in a non-user accessible manner, selected ones of the plurality of components, the relationship among the components and the associated communication protocols; wherein the representation is an extension of the group consisting of the Common Information Model and the InCharge Common Information Model; wherein the creating at least one non-specific representation of the communication protocols is selected from the group consisting of: OSPFArea, OSPFAreaConfiguration, OSPFService, OSPFInterface, OSPFVirtualInterface, OSFPNeighborEndpoint, OSPFNetwork, OSPFNeighborRelationsip and OSFPVirtualLink; wherein the OSPFArea represents a set of IP subnets within the system;
      determining a mapping between a plurality of events and a plurality of observable events occurring among the components and among the communication protocols, wherein the mapping is represented as a value associating each event with each observable event, and
      performing the operation in conjunction with the events and observable events, wherein events associated with the communication protocols are distinguished from events associated with the components.

9. The apparatus as recited in claim 8, wherein the protocols are selected from the group consisting of: IGP, EGP, BGP, and OSPF.

10. The apparatus as recited in claim 8, wherein the processor executing code for representing the at least one communication protocol comprising the steps of:
    creating at least one non-specification representation of relations along which the events propagate amongst the communication protocols, wherein the representations of relations are selected from the group consisting of: ConnectedSystem, ConsistsOf, ConnectedTo, AccessedVia, HostedBy, ComposedOf and LayeredOver.

11. The apparatus as recited in claim 8, wherein the processor executing code for representing the at least one communication protocol comprising the steps of:
    creating at least one non-specific representation of the communication protocols selected from the group consisting of: AS, Configuration, Cluster, BGPService, BGPNewighborEndpoint, BGPSession; and
    creating at least one non-specification representation of relations along which the events propagate amongst the communication protocols, wherein the representations of relations are selected from the group consisting of: ConnectedSystem, ConsistsOf, ConnectedTo, AccessedVia, HostedBy, ComposedOf and LayeredOver.

12. The apparatus as recited in claim 8, wherein the processor executing code for determining a mapping comprising the steps of:
creating a first mapping of between a plurality of events and a plurality of observable events occurring among the communication protocols; and
creating a second mapping of between a plurality of events and a plurality of observable events occurring among the components.

13. The apparatus as recited in claim 8, wherein the operation is selected from the group consisting of: monitoring, discovering, managing, analyzing and displaying.

14. The apparatus as recited in claim 13, wherein the analyzing operation is selected from the group consisting of: root-cause, impact, connectivity and performance.

15. The apparatus as recited in claim 8, further comprising:
an input/output device in communication with the processor.

16. A non-transitory computer-readable medium providing code for providing instruction to a processor for operating on a system containing a plurality of components communicating using at least one communication protocol, the code instructing the processor to execute the steps of:
representing, in a non-user accessible manner, selected ones of the plurality of components, the relationship among the components and the associated communication protocols; wherein the representation is an extension of the group consisting of the Common Information Model and the InCharge Common Information Model; wherein the step of representing the at least one communication protocol comprises the steps of: creating at least one non-specific representation of the communication protocols selected from the group consisting of: OSPFArea, OSPFAreaConfiguration, OSPFService, OSPFInterface, OSPFVirtualInterface, OSFPNeighborEndpoint, OSPFNetwork, OSPFNeighborRelationsip and OSFPVirtualLink; wherein the OSPFArea represents a set of IP subnets within the system; and
determining a mapping between a plurality of events and a plurality of observable events occurring among the components and among the communication protocols, wherein the mapping is represented as a value associating each event with each observable event; wherein the mapping is based on the representation, and
performing the operation, based on the representation, in conjunction with the events and observable events, wherein events associated with the communication protocols are distinguished from events associated with the components.

17. The computer-readable medium as recited in claim 16, wherein the protocols are selected from the group consisting of: IGP, EGP, BGP, and OSPF.

18. The computer-readable medium as recited in claim 16, wherein the code providing instruction to the processor for executing the steps of:
creating at least one non-specification representation of relations along which the events propagate amongst the communication protocols, wherein the representations of relations are selected from the group consisting of: ConnectedSystem, ConsistsOf, ConnectedTo, AccessedVia, HostedBy, ComposedOf and LayeredOver.

19. The computer-readable medium as recited in claim 16, wherein the code providing instruction to the processor for executing the steps of:
creating at least one non-specific representation of the communication protocols selected from the group consisting of: AS, Configuration, Cluster, BGPService, BGPNewighborEndpoint, BGPSession; and
creating at least one non-specification representation of relations along which the events propagate amongst the communication protocols, wherein the representations of relations are selected from the group consisting of: ConnectedSystem, ConsistsOf, ConnectedTo, AccessedVia, HostedBy, ComposedOf and LayeredOver.

20. The computer-readable medium as recited in claim 16, wherein the code providing instruction to the processor for executing the steps of:
creating a first mapping of between a plurality of events and a plurality of observable events occurring among the communication protocols; and
creating a second mapping of between a plurality of events and a plurality of observable events occurring among the components.

21. The computer-readable medium as recited in claim 16, wherein the operation is selected from the group consisting of: monitoring, discovering, managing, analyzing and displaying.

22. The computer-readable medium as recited in claim 21, wherein the analyzing operation is selected from the group consisting of: root-cause, impact, connectivity and performance.

* * * * *